Fig. 1.

Aug. 30, 1949.　　　E. W. BALLENTINE ET AL　　　2,480,623
DRIVE FOR PHONOGRAPHS AND THE LIKE
Filed May 12, 1944　　　　　　　　　　　　4 Sheets-Sheet 3

Fig.3.

INVENTORS:
Earle W. Ballentine &
BY Sven A. Stolberg,
Atty.

Aug. 30, 1949.　　　E. W. BALLENTINE ET AL　　　2,480,623
DRIVE FOR PHONOGRAPHS AND THE LIKE

Filed May 12, 1944　　　　　　　　　　　　4 Sheets-Sheet 4

Fig. 4

Inventors:
Earle W. Ballentine &
Sven A. Stolberg,

Patented Aug. 30, 1949

2,480,623

UNITED STATES PATENT OFFICE 2,480,623

DRIVE FOR PHONOGRAPHS AND THE LIKE

Earle W. Ballentine, Wilmette, and Sven A. Stolberg, Chicago, Ill., assignors, by mesne assignments, to Raytheon Manufacturing Company, Newton, Mass., a corporation of Delaware Application May 12, 1944, Serial No. 535,218

12 Claims. (Cl. 274—15)

This invention relates to improvements in the means for driving the turntables and the tone-arm controls for phonographs, and like devices. More especially the invention relates to the means for driving the tone-arm controlling devices; but it also relates to means for driving the turntable so that all these elements are driven in proper relationship. In this connection we have provided a common drive motor or prime mover for both the turntable and the tone-arm controls; and a principal object of the invention is to provide improved driving means therefrom to both the turntable and the tone-arm controls.

In connection with the foregoing, we have also herein provided friction drives for both the turntable and the tone-arm controls. At the present time there are in extensive use friction drives for the turntables of such devices; and according to one feature of our present invention we provide a supplemental friction drive from the motor driven element to the tone-arm controls, and also provide suitable control means for ensuring proper commencement of the tone-arm control movements, and for ensuring that these movements will be carried through one complete cycle of operations and then will be discontinued with the tone-arm in desired position.

More specifically, according to one important feature of our present invention we provide a friction gear drive for the tone-arm controls, including a friction gear train including an idler friction gear element which may be thrown into and out of engagement with a continuously rotating friction gear element driven by the motor. Such idler friction gear element may be shifted into and out of engagement with the motor driven friction gear element by swinging said idler element about the axis of rotation on which rotates the other friction gear element with which said idler engages; thus maintaining engagement at all times between said idler element and said other friction gear element to which the power is delivered. By this means we ensure perfect contact and engagement at all times between said idler element and the driven element, and commencement and discontinuances of power delivery are effected by slight swinging or rocking movements easily controlled, and always under perfect adjustment.

A further feature of the invention relates to an improved means to cause such swinging or rocking movement of such idler friction gear element for the intended purposes. In this connection we have provided a positive clutch device for positively disengaging the idler element at the termination of a cycle of tone-arm control movements, thus assuring definitely controlled stoppage of the tone-arm control devices at the proper cyclic point. In this connection we have also provided means to assure commencement of the cycle of tone-arm control movements by engagement of such clutch device at completion of playing of a record, and so that the friction drive will then continue until completion of the cycle of tone-arm control movements. Furthermore, there are at the present time in use two types of records, namely those having at the terminal end of the sound track or groove a spirally continuing groove portion so that the tone-arm will be carried rapidly inward toward the axis of rotation and thus will trip a suitable control device connected to the tone-arm; and those having at the terminal end of the sound track a circular eccentrically cut groove which will cause the tone-arm to rock back and forth to trip a suitable form of control device connected to the tone-arm. We have herein disclosed means to ensure tripping of our improved friction drive gear transmission device at the termination of play of a record, for either or both of these two types of record terminal.

A further feature of the present invention relates to the provision of means whereby under a "normal" setting of the parts the termination of playing of a record will institute a cycle of tone-arm control operations, which cycle will then continue through to conclusion, resulting in commencement of play of the next record, (or repeating of the original record,) upon termination of which play the cycle will be repeated, thus resulting in continuous operation and carrying through of a cycle of tone-arm controls after completion of each play, and followed by playing of a record after completion of each cycle of tone-arm control movements. A further feature and object of the invention is to provide means whereby the operations of the devices may be controlled for various conditions. This means includes a manually or otherwise set lever which may be placed in either of several positions. These include an "Off" position in which the functioning of the friction drive is locked out, and in which the driving motor itself is also shut-off; a "Manual" position in which the motor switch is closed to bring the motor into operation, but in which the functioning of the friction drive is still locked out, so that the tone-arm may function to play a record placed on the turntable, but with completely manual control:; an "Automatic" position in which the operations of the tone-arm control devices are automatically carried through normally; and a "Reject" position in which the functioning of the tone-arm control devices is instituted and carried through to conclusion irrespective of the movement of the tone-arm inwardly far enough to institute such cycle of movements, thus making it possible for the operator to institute a cycle of operations to throw the tone-arm outwardly far enough to make possible a removal of the record from the turntable (or to cause automatic record change, if the machine is provided with a "record changer"). Since this last type of operation is an abnormal operation we have made provision for spring return of the manually set lever to the "Automatic" position when said lever is manually released, so that it will not be inadvertently left in such "Reject" position.

Another object of the invention is to provide a very simple form of control, one which may be readily made from few parts of simple manufacturing processes, and one which will not readily get out of order in normal service; also one which may be brought into small compass so as to take up relatively small space and substantially without any increase of the overall dimensions of the structure within which it is built.

The following statements will serve additionally to make clear certain of the features of the present invention, and certain of the objects which we seek to accomplish and have accomplished by our present improvements.

When using a single motor for driving both the turntable and the tone-arm control devices, said devices must be geared to said motor so that they will each rotate at proper speed. Generally the turntable speed is fixed at 78 R. P. M., for proper translation of the record, so that speed is fixed in advance. The rotative speed of the tone-arm operating cam (when used) is determined by the time interval desired for performance of a single complete cycle of tone-arm (and record changing) operations, since it is usual to perform these operations during a single revolution of said cam. Usually the time interval allowed for these operations is from 6 to 10 seconds, corresponding to a cam rotative speed (while rotating during the tone-arm control operations) of 10 to 6 R. P. M. This means that as between the turntable rotative speed and that of the cam element there is a ratio of from 13:1 to 7.8:1. The gear ratios necessary between the motor speed and the turntable and the cam element must therefore be made such as to conform to these conditions.

It is further noted that under abnormal conditions of operation the parts may become blocked or locked while the motor is running, so that proper functioning is prevented; for example, the tone-arm may either become blocked so that it cannot swing properly under impulse of the operating cam or it may be forcibly rocked to one side or the other against the dictates of the cam position; or other abnormal conditions may obtain which must be provided for.

Under such abnormal conditions as just referred to (or others) provision must be made to permit the motor to come to rest, or to permit slippage somewhere in the train of gearing between the motor and the blocked element. Furthermore, since the motor generally rotates at comparatively high speed, so that a quite large overall gear ratio is present, it follows that large forces will be developed in the gear train, especially at and near to the terminal thereof. These forces are often sufficient to break parts or strain them to the damaging point. When a friction drive is used somewhere along the gear train slippage may be provided for to relieve such abnormal forces when developed. Such slippage, however, is objectionable if it occurs at improperly provided places, or under unsuitable conditions, as it may, and frequently will, result in "grooving" of one of the friction drive elements (that is, scoring or cutting the same) so that thereafter objectionable noises will occur during operation of such injured parts in service. Such slippage between a small diameter pinion and a larger wheel is most likely to groove such larger wheel, with permanent injury thereto. This is less likely to occur when the slippage occurs between two wheels of larger diameter, and which are designed to meet the slippage condition.

Now the turntable is frequently driven by friction drive directly to the periphery of such turntable, for which purpose said periphery is frequently provided with a flange against which a friction driving wheel engages under suitable pressure. When in operation, with the turntable rotating and interpreting a record, any noises developed by the driving motor are communicated to the record, and are transmitted to the sound reproducing devices in exaggerated volume, so they are especially objectionable; and this is true either in the case of gear or friction drive to the turntable. Also, in the case of friction drive (for example to the flange as just above mentioned), the transmission of such noises is increased by increase of friction pressure to such flange, so it is desirable to employ as light pressures between the friction drive wheel and such flange as are consistent with proper rotation of the turntable and record during translation. When the friction drive to the turntable flange is only called upon to transmit turntable rotative power, this frictional contact may be made very light. It is further noted that during playing or translation of the record the tone-arm control cam and other related devices are at rest and are not being driven so that they require no power at such time; but on the contrary when said tone-arm control cam and related devices are functioning for tone-arm control operations, the record translation is not functioning, so that any noises developed at such time will not be transmitted to the sound reproducer from any record. Accordingly, the pressure developed between the friction drive wheel and the turntable flange during cam operation for tone-arm control is not a factor affecting noise transmission to the sound devices.

We propose to effect a friction drive from the friction drive wheel to the tone-arm control cam directly (that is, not through the flange of the turntable), so that the relatively light frictional engagement of said friction drive wheel and the turntable flange is not called upon to deliver the power required to actuate the tone-arm control cam and related devices. Due to this circumstance we are still able to design our improved drive mechanism with a light pressure between said parts for the benefits already indicated.

We have provided a movable friction wheel element in the gear train leading to the tone-arm control cam, which wheel element is normally out of engagement with the friction drive wheel in contact with the turntable flange, but is moved into contact therewith when drive is to be established to the tone-arm control cam. This contacting movement takes place when the playing of the record has ceased, and therefore does not occur during playing of the record. We have so related the parts that when this movable friction wheel is so moved into driving contact with the friction drive wheel, it serves to increase the pressure existing between the motor shaft (or the friction pinion on said shaft) and the friction drive wheel, so that provision is immediately made for transmission of the greater amount of power needed for tone-arm control operations, and without any increase of noise transmission from the motor to any record (since the record is not being interpreted at such time). Such increased pressure thus developed at such time serves to insure against slippage between the motor shaft (or friction pinion) and the friction drive wheel, so that danger of "grooving" is thus substantially eliminated. Furthermore, this insurance against such slippage also insures against wearing of the motor shaft or pinion thereon. It is here noted that frequently this motor shaft or the pinion thereon is roughened so as to increase frictional contact thereto, and any such slippage serves to soon smoothen such roughened surface, or to "polish" it, with resultant loss of driving power for the normal turntable drive during record interpretation. Any such loss of power is liable to result in reduction of turntable rotative speed during record playing, or "creeping," with consequent false translation of sounds and notes from the record. It is much to be avoided. One object of our present invention is to provide driving means which will substantially eliminate any such objectionable results. Nevertheless in case of jamming of the tone-arm cam operating devices slippage may occur in the friction train which we have provided, but at a point or points where such slippage will not injure the friction wheels, and will not occur at the driving contact between the motor shaft (or pinion) and the friction drive wheel where such slippage would be harmful.

Another feature of our present invention concerns the provision of a train of gear drive including the friction drive feature and wherein the completion of the driving train is effected by engagement of friction wheels together as distinguished from engagement of toothed gears at such point. This is advantageous since this arrangement ensures perfect driving engagement when contact is established between such friction wheel elements, regardless of their relative angular relationship at the instant of contact; whereas in the case of gear drive at such location it would be necessary to ensure exact tooth mesh between the engaging gears at the instant of engagement, which would be very difficult or impossible.

It is a further object of our present invention to secure all of the foregoing benefits attendant on friction drives for the present purpose, in combination with the use of a toothed drive for the final transmission of power to the tone-arm cam element itself. This cam element when being driven rotates at slow speed, and the use of a friction drive at this point might present objectionable conditions of operation; but by the use of a toothed drive at this point we are able to overcome this objection, without sacrificing any of the benefits and advantages of friction drive otherwise present as previously stated herein.

In this connection also we are able to use the friction drive feature at locations where the peripheral speeds are relatively high and the forces transmitted relatively small, in combination with the gear toothed drive at the final stage. We are also able to make use of friction drive elements of relatively large diameter thus further reducing the dangers of slippage under normal operating conditions.

It is also here noted that since we secure drive of the tone-arm cam through a driving train which does not include the turntable itself, there is no need in any case to provide a rotating shaft or spindle for said turntable, so that we are able to use the features of our present invention in combination with various forms of stationary or non-rotating turntable center-post.

In the drawings we have shown the features of our present invention as embodied in a drive for the turntable 10. This turntable is shown as set onto the usual vertical spindle 11 which spindle extends upwardly from the cabinet table 12. We have also shown the tone-arm spindle 13 journalled in the stand 14 which extends up from the cabinet table 12, so that said spindle 13 will rock with the tone-arm, or vice versa, in well understood manner. We have also shown the pin or stud 15 extending up through the spindle so that the raising and lowering of the tone-arm in comparsion to the record on the turntable may be effected in well understood manner. The spindle 13 carries the tone-arm lever 16 on its lower end and below the cabinet table, so that rocking of this lever serves to effect rocking of the tone-arm for control purposes, and vice versa.

In these drawings we have also shown the drive motor 17 carried from the bottom of the cabinet table, and having the small shaft 18 which reaches up through the opening 19 in the cabinet table; and we have also shown the small plate 20 which is movably or slidably mounted on the cabinet table, and carries the friction idler wheel 21 suitably journalled to said plate 20; and we have shown the spring 22 drawing the plate 20 over towards the rim of the turntable. Said turntable has its edge portion 23 flanged downwardly and the periphery of the friction wheel 21 drives against the inside surface of said flange. The wheel 21 is preferably rubber surfaced so as to better engage both the motor shaft 18 and the turntable flange, according to well understood present practice.

The foregoing turntable drive is well known and widely used at the present time, and we do not make any claim to the same per se. It is noted that as long as the motor 17 is operating the friction driven wheel 21 is rotating at constant speed. We have provided friction drive elements for causing tone-arm control operations through a cycle of movements from power derived from this wheel 21 or its equivalent.

Any suitable form of tone-arm control may be provided for effecting the desired tone-arm movements. In the present drawings we have shown the features of our present invention as combined with a tone-arm control including the rotary cam element 24 which is journalled to the under side of the cabinet table as shown at 25. This cam element includes the circular cam track 26 extending from the radial flange 27 to the terminal point 28. The tone-arm lever 16 carries a cam follower 29 which may travel in the cam track 26; so it will be seen that when the tone-arm lever moves inwardly to a point close to the journal 25 (being the final position of the tone-arm at completion of a record), the cam follower 29 stands close to the journal 25. Then, as the cam element 24 commences to rotate in the counter-clockwise direction as shown by the arrow (Figure 2), the tone-arm lever will be swung outwardly to a position beyond that shown in Figures 1 and 2, far enough to permit record changing to be effected, and thereafter the tone-arm may be restored to the position for commencement of playing of the record which has been placed on the turntable, either a ten or a twelve inch diameter record, and playing of such record may be commenced by lowering of the tone-arm. The pin 15 rests on the edge portion 30 of the cam element 24, and said edge portion is provided with a depression 31 at the proper point to provide for restoration of the tone-arm into playing position or elevation, according to usual practice at the present time.

Sometimes provision is made for re-setting the tone-arm to either the ten or the twelve inch diameter position, and we contemplate use of suitable tone-arm controls for this purpose, in conjunction with our presently disclosed features. Thus, for example, we may use as the tone-arm control such a construction as that disclosed in the co-pending application of Earle W. Ballentine, Serial No. 507,820, now abandoned, for improvements in Phonographs and the like, filed October 27, 1943, of which control we have herein shown only the cam element 24 in the present application, or any other suitable form of tone-arm control in combination with our herein disclosed drive means.

The edge portion of the circular cam element 24 is provided with gear teeth 32; and we provide a drive shaft 33, journalled to the bottom face of the cabinet table 12. The lower end of this drive shaft carries the pinion 34 meshing constantly with the teeth 32 of the cam element. The upper end of this shaft 33 carries the friction wheel 35 above the cabinet table, and within the confines of the turntable flange 23. It is thus evident that this friction wheel 35 must always rotate with the cam element and vice versa.

Figure 2:
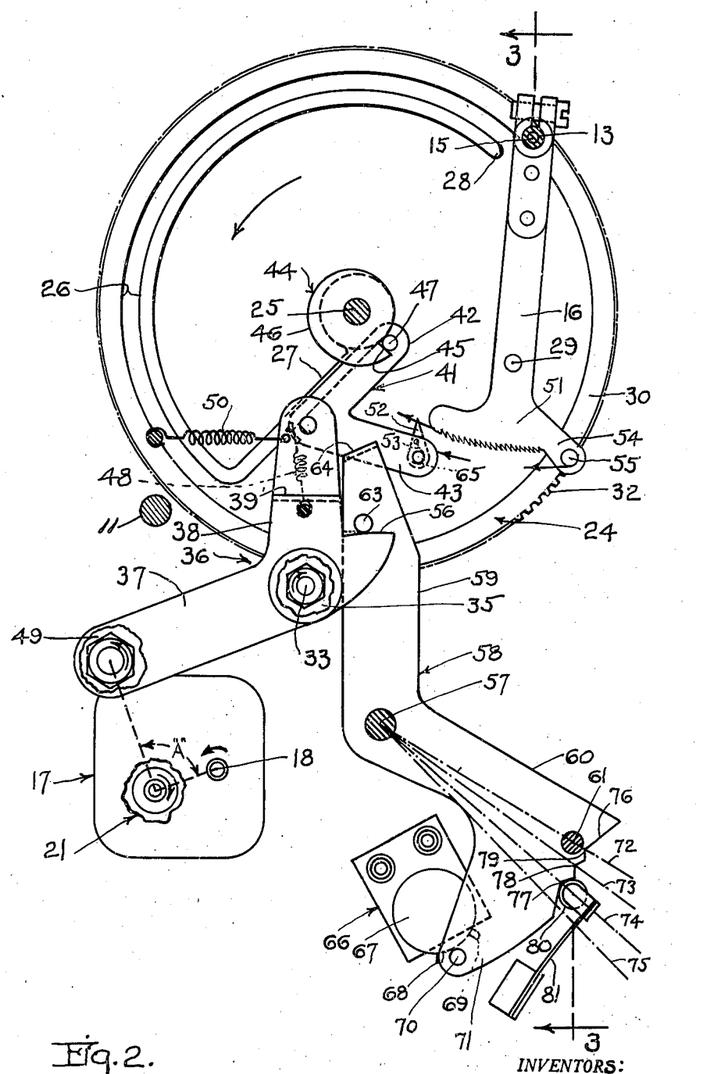
Fig. 2 is a horizontal section on the line 2—2 in Fig. 3.
Figure 3:
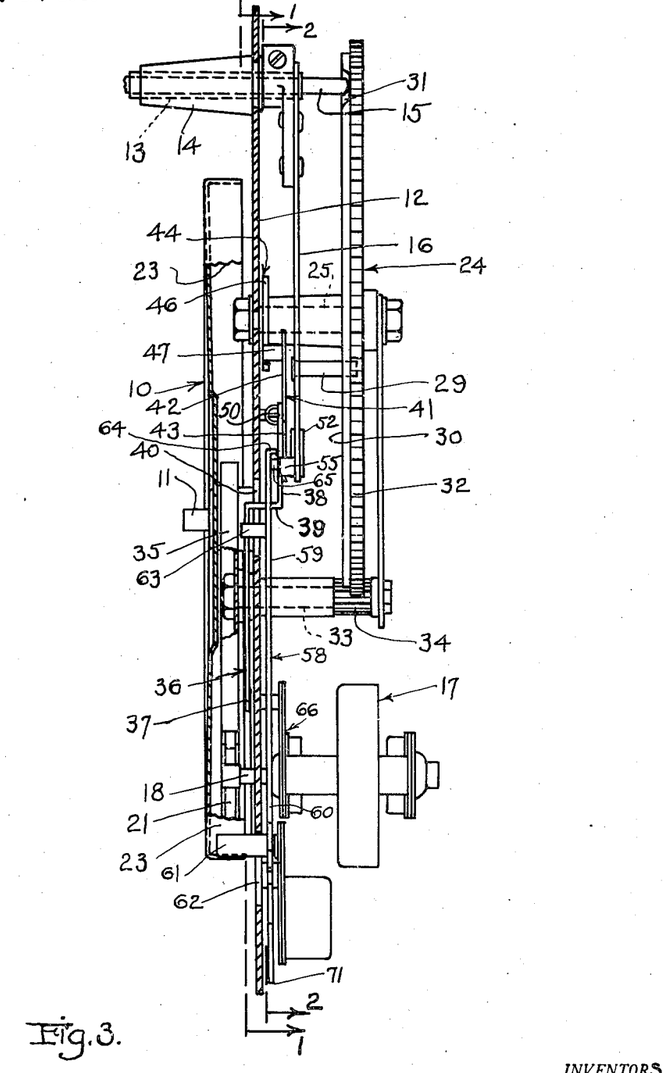
Fig. 3 is a vertical section through the structure showing, in elevation, the pertinent portions of the various mechanisms.

Also swingingly mounted on the stand which journals the shaft 33, and between the wheel 35 and the cabinet table, is the bell crank element 36. This bell-crank has the two arms 37 and 38; and the arm 38 is provided with an offset 39 so that the end portion of this arm 38 lies considerably below the plane of the arm 37. Furthermore, the cabinet table 12 is provided with the opening 40 through which this off-set reaches so that the end portion of the arm 38 lies beneath the cabinet table, but is able to rock back and forth with the bell-crank swingings as will be readily apparent from comparison of the several figures. The end portion of the arm 38, beneath the cabinet table, has journalled thereto the bell-crank element 41 having the arms 42 and 43, as best shown in Figure 2.

There is a cam clutch element 44 rotatably connected to the shaft 25 and cam element 24 to rotate therewith. This cam clutch element 44 has the radial shoulder 45 with the spiral edge surface 46 extending around the element. The arm 42 of the bell-crank 41 has the stud 47 in position for engagement by the shoulder 45 when the cam elements 24 and 44 complete their revolution to their starting point. Evidently such engagement will cause the final stages of the revolution of these cam elements to draw the bell-crank 41 with them, thereby also rocking the bell-crank 36 clock-wise. We have provided a light spring 48 extending between the bell-crank 41 and the arm 38 of the bell-crank 36, and tending to retain the stud 47 over against the cam element 44 so that proper functioning of the parts will be assured.

The free end of the arm 37 of the bell-crank 36 has journalled thereto the friction idler element 49, which element is constantly in frictional driving engagement with the wheel 35; and since the bell-crank 36 is pivoted concentric with the friction wheel 35 it follows that as the bell-crank 36 is rocked back and forth the wheel 49 will maintain its frictional engagement with the wheel 35 and under a constant pressure as originally determined in the setting and assembly of the train of elements. When the bell-crank 36 is rocked counter-clockwise from the position of Figures 1 and 2, the friction wheel 49 will be brought into frictional engagement with the friction wheel 21 (being driven by the motor) so that at once drive will be established also to the shaft 33 by which the cam element 24 is driven. We have provided the relatively stiff spring 50 having one end connected to the arm 38 of the bell-crank 36 and the other end connected stationary to the cabinet table, so that this spring tends to rock the bell-crank 36 and carry the friction wheel 49 into engagement with the wheel 21 as soon as the stud 47 of the bell-crank 41 is released from the shoulder 45.

It is now evident that the following operations are possible. Rocking of the bell-crank 41 clockwise from the position of Figures 1 and 2 will release the stud 47 from engagement with the shoulder 42, so that immediately thereafter the bell-crank 36 may rock counter-clockwise under stress of the spring 50, to carry the wheel 49 into contact with the wheel 21. It is noted that as soon as counter-clockwise rocking of the bell-crank 36 commences, the arm 38 will be carried toward the left, carrying with it the bell-crank 41 and stud 47, so that re-engagement of said stud with the shoulder 45 is provided against until completion of a cycle of operations. Thus the release of the stud 47 from the shoulder 45 will bring the friction wheel 49 against the friction wheel 21 to institute a cycle of rotational movements.

Figure 1:
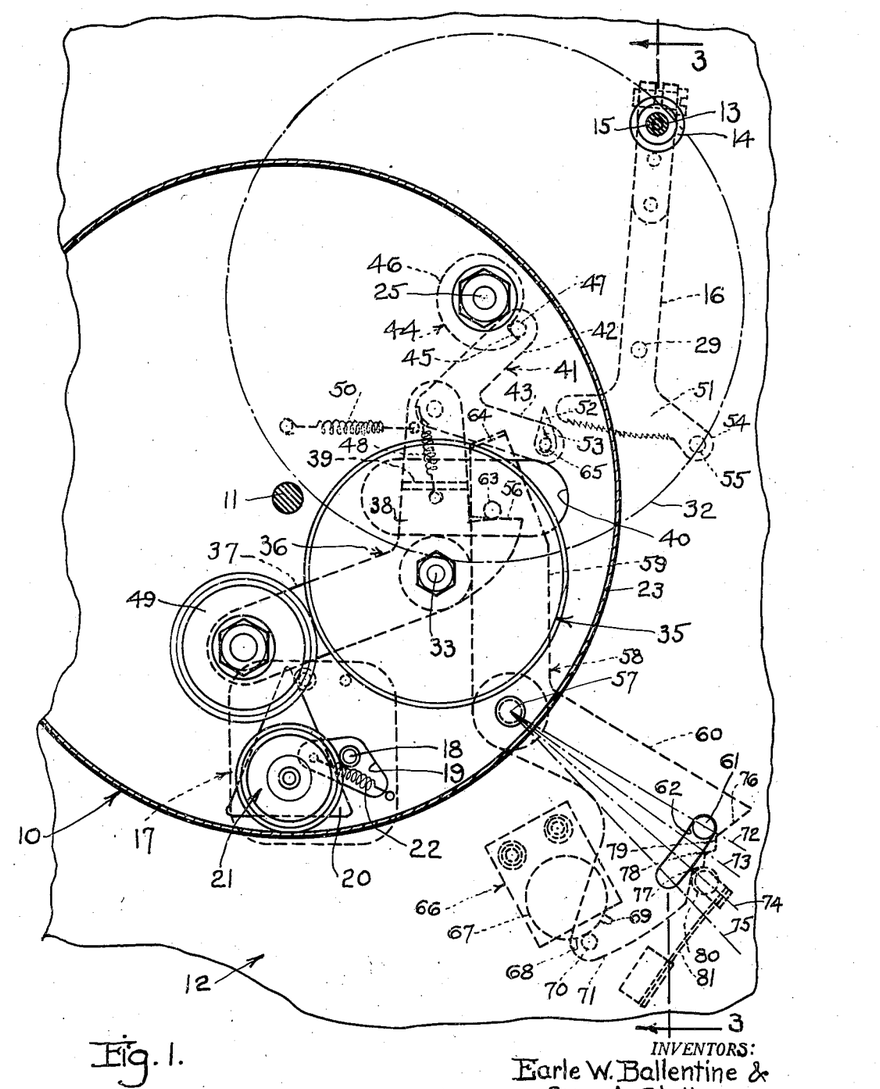
Fig. 1 is a horizontal sectional view through the turntable and spindle of the phonograph, showing the underlying parts of the structure in plan, this view being taken on the line 1—1 in Fig. 3.

It is also noted that once the shaft 25 (and cam elements 24 and 44) has commenced rotation under the drive thus established the shoulder 45 will travel counter-clockwise from the position of Figures 1 and 2, so that if the bell-crank 41 be then released so that the light spring 48 may rock the bell-crank 41 counter-clockwise, the stud 47 will rest against the edge cam surface of the cam element 44 until finally it completes one revolution of the shaft 25 (and cam elements 24 and 44), whereupon the shoulder 45 will come into engagement with the stud 47. A slight continued rotation of the shaft 25 will then cause said shoulder to rock the bell-crank 41, or draw the same with the shoulder against the force of the spring 50, so that the bell-crank 36 will be rocked clockwise to dis-engage the wheel 49 from the rotating motor driven wheel 21. Promptly thereafter rotation of the shaft 25 will cease, and the cam elements 24 and 44 will come to rest. The parts are of course so designed that this final action occurs at completion of a cycle of movements of the tone-arm controls. It is here noted that since the rocking of the bell-crank 36 to carry the friction wheel 49 from the motor driven wheel 21 is due to the counter-clockwise rotation of the shoulder 45 thus carrying the stud 47 with said shoulder, and since the disengagement of the wheel 49 from the wheel 21 discontinues the supply of power to the cam element, it would seem at first that the wheel 49 might not be fully disengaged from the wheel 21. However, the inertia of the cam wheel and connected parts is found to be sufficient to ensure the desired and proper completion of the swinging action of the bell-crank to ensure complete disengagement of the wheel 49 from the wheel 21. Furthermore, any retrograde movement of the bell-crank and wheel 49 which might be caused by the tension of the spring 50 is prevented as long as the stud 47 remains engaged with the shoulder 45 and as long as any backward movement of the cam wheel does not occur. Such backward movement is prevented by reason of the friction of the cam followers with the cam wheel, since such restraining force acts through the gear and friction wheel train and is thus so multiplied at the position of the friction wheel 49 that the force of the spring 50 is insufficient to cause any retrograde swinging of the bell-crank until the stud 47 is purposely disengaged from the shoulder 45.

To institute a cycle of operations automatically by tone-arm movements we have made the following provisions.

The tone-arm lever 16 has at its free end the segment 51 which is formed concentric with the axis of tone-arm swing, and this segment has the edge teeth facing against movement of the tone-arm lever outwardly (that is, to larger record radius). The free end of the arm 43 of the bell-crank 41 has the dog 52 facing upwardly in position to engage these teeth, and a light spring 53 tending to hold said dog upward as shown in Figures 1 and 2. As the tone-arm is carried inwardly towards the cam element shaft 25 during the playing of the record the time will arrive when the teeth of the segment 51 commence to ride over the dog 52, so that any subsequent retrograde movement of the tone-arm must result in drawing the dog 52 towards the right, with consequent down rock of the bell-crank 41, sufficient to disengage the stud 47 from the shoulder 45 with results already explained. When using the present improvements with that type of record which is provided with the eccentrically formed circular track at the end of the sound track, which results in oscillation of the tone-arm lever after the playing of the record has been completed, it is seen that such rocking will immediately result in tripping off the drive of the cam element 24 for institution of a cycle of movements as already explained.

The segment 51 is also provided at its far end with a finger 54 having the stud 55; and this stud 55 is placed at such radius from the axis of tone-arm rock that as the tone-arm is carried inwardly by a spiral terminal groove at the end of the sound track of a played record said stud 55 will engage the curved end edge of the arm 43 of the bell-crank 41 to rock said bell-crank clockwise and thus institute a cycle of operations such as we have already described. It is thus evident that we have made provision for institution of a cycle of operations by the terminal groove of either the eccentric circle type or the spiral extension type, both of which are widely used at the present time.

With the devices so far disclosed herein the cycles of operation would alternately commence and be carried through to completion continuously, as for an automatic series of operations. We have, however, made provision for other control of these cycles of operation, which we shall now disclose. The bell-crank 36 has a shoulder 56 formed about the center or pivot 57 as a center (which pivot we shall presently refer to). We have provided a control lever or arm element 58 having the arm 59 which extends past the shouldered portion 56 of the bell-crank 36, and also having the arm 60 which reaches to a point convenient to the operator. This lever element 58 is conveniently pivoted on the point 57 and is located beneath the cabinet table 12; and the end portion of the arm 60 has the finger piece 61 reaching through an arcuate opening 62 in the cabinet table. The arm 59 of this lever element 58 carries the stud 63 in position to move over the shoulder 56 of the bell-crank element 58 and thus to prevent rock of the bell-crank 36 from its non-drive position shown in Figures 1 and 2 as long as the lever element 60 stands in any position such that the stud 63 overlies the shoulder 56. Any such position of the lever arm 58 will interfere with the automatic functioning of the parts already described in detail. On the contrary, by rocking the lever arm 58 clockwise from the position shown in Figures 1 and 2 the stud 63 will be carried out from the swing of the shoulder 56 with swing of the bell-crank 36, thus freeing the parts for the automatic operations already described.

The free end of the arm 59 of the lever element 58 is also provided with a cam shaped flange 64 which reaches towards the arm 43 of the bell-crank 41; and a stud 65 is carried by the arm 43 of said bell-crank 41 in position such that when the lever 58 is rocked fully in the clockwise direction the cam flange 64 will engage said stud 65 and thus rock the bell-crank 41 to disengage the stud 47 from the shoulder 45 and institute a cycle of movements. By holding the lever arm 58 in such fully rocked position continuous cycles of operation may be manually ensured regardless of interpretation of records.

We mount the control switch for the motor 17 in position for operation by this lever arm 58. This is the switch element 66. It includes a rockable element 67 having the two fingers 68 and 69 which may be engaged by a stud 70 carried by the end portion 71 of the lever arm 58. The arrangement is such that when the lever arm 58 is rocked over to the "Off" position said switch will be opened; whereas when said lever arm is rocked over to the other extreme said switch will be rocked to the closed circuit position to institute motor operation. In other words, the extreme rocked positions of the lever arm serve to shift the switch to either the open or the closed circuit position as required for motor operation. Having moved said switch to the closed circuit position it will remain in that position until it is purposely moved to the open circuit position by full movement of the lever arm to the "Off" position.

As previously stated in the preamble hereof, we have made provision for four positions of control, namely "Off," "Manual," "Automatic" and "Reject." These four positions of the lever arm 58 have been provided for. They are indicated by the lines 72, 73, 74 and 75, respectively, in Figures 1 and 2, and similar or suitable markings may be provided on the visible surface of the cabinet table, as desired. Preferably we have also provided the cam surface 76 on the end portion of the lever arm 60, for a purpose to be presently explained.

We have indicated the notches 77, 78 and 79 in the end edge of the arm 60; and also a roller 80 carried by the leaf spring 81, which roller will engage a selected one of these notches and thus retain the lever arm 58 in adjusted position. These notches correspond to the positions "Off," "Manual" and "Automatic." The cam surface 76 corresponds to the position "Reject." These notches are so positioned, with respect to the spring pressed roller 80 that the lever arm will be held in the following conditions.

For "Off," the stud 63 engages the shoulder 56 to hold the friction drive roller 49 away from the wheel 21 so that there can be no drive effected. Also, in this position the switch is in the open circuit position so that the motor is at rest.

For "Manual" the stud 63 still engages the shoulder 56 to hold the friction drive roller 49 away from the wheel 21 so that no drive is effected on the cam element 24; but the switch has been moved to the closed circuit position so that the motor is operating and the turntable is therefore in rotation. Under these conditions the record on the turntable will be interpreted, but manual operation will be required to effect return of the tone-arm after completion of the sound track interpretation, and automatic operations will not be made.

For "Automatic" the stud 63 has been moved far enough over to clear the shoulder 56, thus permitting automatic operations of the initiation and termination of the cam element 24 operations. This would generally be the normal operation of the device.

The foregoing three positions of the lever arm 58 will be respectively retained by the notches 77, 78 and 79, respectively.

For "Reject" the stud 63 is still further removed from the shoulder 56 so that the cycle of operations may occur, in the sense that the roller 49 may move over into engagement with the wheel 21. However, in this "Reject" position of the lever arm 58 the cam flange 64 engages the stud 65 of the bell-crank 41 to thereby institute an operation of the parts and to bring about a cycle of operations. This will result in one revolution of the cam element 24 when thus instituted. However, it is noted that there is no notch for engagement by the roller 80 for this "Reject" position, and on the contrary said roller will ride up on the cam surface 76 to effect this position, so that as soon as said lever arm 58 is manually released it will return to the "Automatic" position. Thus, if, directly after instituting a "Reject" operation the lever 58 be released it will move naturally to the "Automatic" position, and there remain, and the cycle of operations thus instituted will move through to completion, and then further operations will be on the "Automatic" position. This is as it should be.

It is noted that with the arrangements thus far disclosed the friction wheel 49 remains always in driving contact with the friction wheel 35 under a selected pressure and thus a selected friction contact; and that when drive is to be effected only a slight rock of the bell-crank 36 is necessary to bring the friction wheel 49 into driving contact with the friction wheel 21. Likewise, only a slight rocking movement in retrograde direction is necessary to terminate such drive. It is further noted that when drive is effected it is under frictional engagement due to the spring 50, and that the tension of that spring may be readily adjusted to, the desired amount for proper operation at all times. Furthermore, that since there is but slight rocking movement of the bell-crank 36 necessary between drive and release, it follows that the tension of that spring varies but slightly during that operation. It is also apparent that although drive of the turntable is continuous, the record interpretation has been completed prior to operation of the cam element 24.

Generally the motor shaft or spindle or pinion 18 will be of steel or other suitable metal, and this is also true of the driving periphery of the friction wheel 49. The peripheries of the wheels 21 and 35, on the contrary, will generally be faced with rubber or like material, since it is understood that the best drive contact is established between rubber and metal, generally steel. The "grooving" of the peripheral surface of the wheel 21 is especially to be prevented since that wheel rides constantly in contact with the turntable flange 23, and any irregularity in this wheel will result in production of undesirable noises during record play.

Examination of the conditions existing as between the several wheels and spindle 18, 21, and 49, and the turntable flange when driving the tone-arm control cam element 24, will show the following relationships.

The directions of rotation of these several elements are as indicated by the arrows in Figure 2. Consequently the tendency of the peripheral forces developed at the surfaces of the parts is to cramp the wheel 21 between the motor spindle or pinion 18 and the turntable flange 23, such cramping action being additional to the force exerted by the spring 22. Such action occurs at the very time it is most advantageous, namely, when driving the tone-arm cam element, and when the maximum power is required from the motor. In the scheme shown in Figures 1 and 2 the axes of rotation of the motor spindle, the wheel 21, and the wheel 49 lie in planes substantially at right angles to each other, so that the direct force exerted by the spring 50 to hold the wheel 49 against the wheel 21 does not of itself exert any component of force tending to move the wheel 21 against the motor spindle or pinion 18. In other words, the angle A of Figure 2 is 90 degrees.

Figure 4:
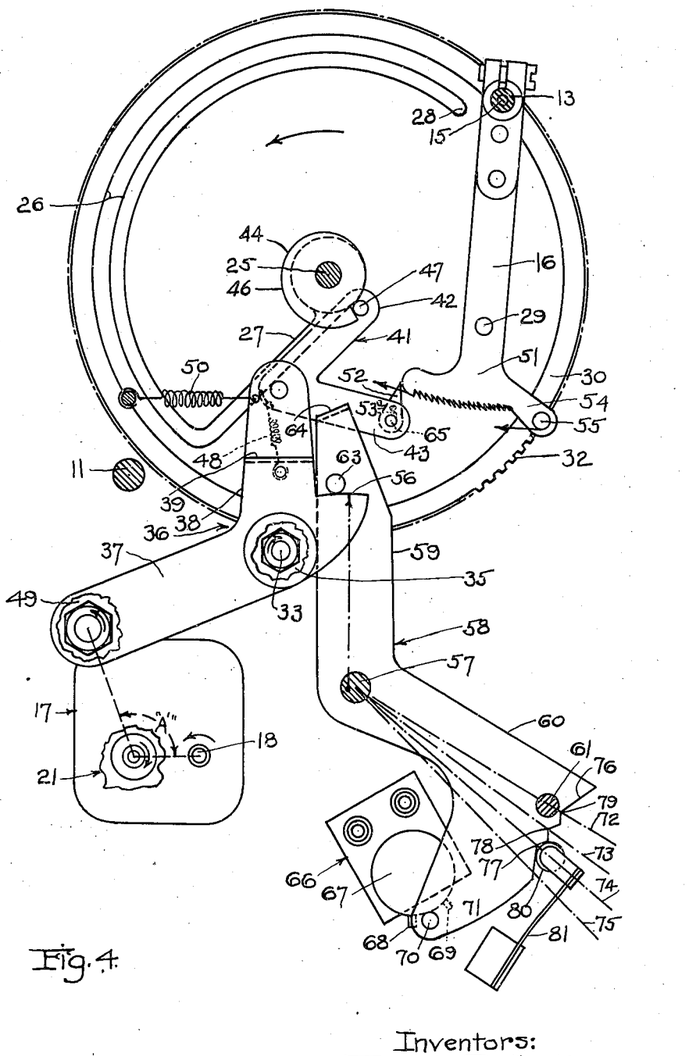
Fig. 4 is a horizontal sectional view similar to Fig. 2 but illustrating a modified form of the invention.

In Figure 4 we have shown a modified scheme in which the parts are so positioned when driving the tone-arm cam element that this angle A' is greater than 90 degrees (actually about 110 degrees), so that the pressure of the wheel 49' against the wheel 21' produces a component of force tending to shift said wheel 21' towards the motor spindle or pinion, thus adding correspondingly to the frictional engagement between these latter parts.

While we have herein shown and describd only certain embodiments of the features of our present invention, still we do not intend to limit ourselves thereto, except as we may do so in the claims to follow.

If desired, the shoulder 56 may be formed on an arc with its center to the left of the center 57 so as to provide a slight relief of the pin 47 from the clutch shoulder 45, to facilitate disengagement of the pin 47 from said shoulder 45 at the instant of commencement of a tone-arm cycle.

We claim:

1. In a phonographic instrument having a turntable and a tone arm for supporting a pickup element to cooperate with a record on the turntable, the combination comprising a rotatable cam element for controlling the tone arm, follower means coupling the tone arm to said cam element, said cam element being effective when in a given position to permit travel of the tone arm transversely toward the axis of the turntable and being effective when rotated away from said given position to restore the tone arm toward a predetermined initial position thereof, a driving motor, a drive element for delivering power from said motor to the turntable, coupling means including a retractable idler operatively interposed between said drive element and said cam element, a lever pivotally mounted at its center and mounting said idler at one end thereof, and spring means connected to the other end of said lever tending to urge said idler into engagement with said drive element, idler control means connected to said cam element for rotation therewith, idler shifting mechanism responsive to said idler control means for retracting said idler out of engagement with said drive element when said cam element attains said given position thereof, and release means operable to free said idler shifting mechanism from said idler control means thereby to effect restoration of the tone arm.

2. In a phonographic instrument having a turntable and a tone arm for supporting a pickup element to cooperate with a record on the turntable, the combination comprising a rotatable cam element for controlling the tone arm, follower means coupling the tone arm to said cam element, said cam element being effective when in a given position to permit travel of the tone arm transversely toward the axis of the turntable and being effective when rotated away from said given position to restore the tone arm toward a predetermined initial position thereof, a driving motor, a drive element for delivering power from said motor to the turntable, coupling means including a friction idler wheel and a friction driven wheel operatively interposed between said drive element and said cam element, shiftable support means for said idler wheel including a lever pivotally mounted at its center and having said idler wheel at one end thereof, an idler control cam arranged to rotate with said cam element, idler shifting mechanism including a follower for said idler control cam, a spring connected to the other end of said lever and effective upon said shifting mechanism tending to urge said idler wheel into an operative position wherein it engages both said drive element and said driven wheel, said idler control cam being effective to shift said idler wheel out of said operative position when said cam element attains said given position thereof, and release means operable to free said idler shifting mechanism from said idler control cam thereby to effect restoration of the tone arm.

3. The combination set forth in claim 2, wherein said release means comprises a member operable by the tone arm, and a tripping device on said idler shifting mechanism adapted to be actuated by said member for disengaging said follower from said idler control cam when a predetermined positioning of the tone arm occurs, whereby restoration of the tone arm is initiated automatically.

4. The combination set forth in claim 2, wherein said release means comprises a manually operable member, and a tripping device adapted to be actuated by said member for disengaging said follower from said idler control cam, whereby restoration of the tone arm is initiated at the will of the operator.

5. In a phonographic instrument having a turntable, a tone arm for supporting a pickup element to cooperate with a record on the turntable, and a motor for driving the turntable, the combination comprising a first friction wheel operated by the motor, a rotatable cam element for controlling the tone arm, follower means coupling the tone arm to said cam element, said cam element being effective when in a given position to permit travel of the tone arm transversely toward the axis of the turntable and being effective when rotated away from said given position to restore the tone arm toward a predetermined initial position thereof, a drive shaft for said cam element, a second friction wheel engageable with said first friction wheel, shiftable mounting means for said second friction wheel, a lever pivotally mounted at its center and having said second friction wheel mounted at one end thereof arranged for coupling said second friction wheel to said cam element drive shaft whereby rotation of said second friction wheel produces rotation of said cam element, shifting mechanism operative upon the other end of said lever whereby said second friction wheel may be retracted from said first friction wheel, one-cycle clutch means between said shifting mechanism and said drive shaft effective when engaged to maintain said second friction wheel engaged with said first friction wheel throughout one revolution of said cam element and to disengage said second friction wheel from said first friction wheel upon completion of such revolution, and clutch control means to effect engagement of said clutch while said cam element is in said given position.

6. The combination set forth in claim 5, wherein said means coupling said second friction wheel to said cam element drive shaft includes positive gearing at the final transmission stage.

7. The combination set forth in claim 5, wherein said means coupling said second friction wheel to said cam element drive shaft includes intermediate friction gearing and final positive gearing.

8. In a phonographic instrument having a turntable, a tone arm for supporting a pickup element to cooperate with a record on the turntable, and a motor for driving the turntable, the combination comprising a rotatable cam element for controlling the tone arm, follower means coupling the tone arm to said cam element, said cam element being effective when in a given rest position to permit travel of the tone arm transversely toward the axis of the turntable and being effective when rotated away from said rest position to restore the tone arm toward a predetermined initial position thereof, a cam element drive shaft in driivng engagement with said cam element, a friction wheel on said shaft, a lever journalled on said shaft supporting an idler friction wheel in continuous engagement with said first-named friction wheel, a second cam arranged to be driven by said cam element drive shaft, a follower for said second cam connected to said lever whereby to rock said lever when said cam element attains its rest position, a friction drive wheel powered by said motor arranged to be engaged by said idler friction wheel at all times except when said lever is rocked by said second cam, spring means for biasing said lever to produce such engagement between said friction drive wheel and said idler wheel when said second cam follower is disengaged from said second cam, and release means to effect disengagement of said cam follower from said second cam while said cam element is at rest.

9. The combination set forth in claim 8, and means to block movement of said lever under the influence of said spring means irrespective of the action of said release means, whereby movement of said cam element may be prevented at the will of the operator.

10. In a phonographic instrument having a turntable, a tone arm for supporting a pickup element to cooperate with a record on the turntable, and a motor for driving the turntable, the combination comprising a rotatable cam element for controlling the tone arm, follower means coupling the tone arm to said cam element being effective when in a given rest position to permit travel of the tone arm transversely toward the axis of the turntable and being effective when rotated away from said rest position to restore the tone arm toward a predetermined initial position thereof, a cam element drive shaft positively geared to said cam element, a friction wheel on said shaft, a bell crank journalled on said shaft supporting an idler friction wheel in continuous engagement with said first-named friction wheel, a second cam rigidly connected to said cam element for rotation therewith, a follower for said second cam connected to said bell crank whereby to rock said bell crank when said cam element attains its rest position, a friction drive wheel for delivering power from the motor to the turntable and arranged to be engaged by said idler friction wheel at all times except when said bell crank is rocked by said second cam, spring means for biasing said bell crank to produce such engagement between said friction drive wheel and said idler wheel when said second cam follower is disengaged from said second cam, and release means to effect disengagement of said cam follower from said second cam while said cam element is at rest.

11. The combination set forth in claim 10, wherein said release means comprises a toothed sector on said cam element follower means, and a dog on said second cam follower permitting movement of said toothed sector toward the axis of the turntable without effect but causing disengagement of said follower from said second cam as an incident to any retrograde movement of the tone arm and said toothed sector.

12. The combination set forth in claim 10, wherein said release means comprises a manually operable reject member to effect disengagement of said second cam follower from said second cam.

EARLE W. BALLENTINE.
SVEN A. STOLBERG.

REFERENCES CITED

The following references are of record in the file of this patent:

UNITED STATES PATENTS

| Number | Name | Date |
|---|---|---|
| 2,289,355 | Green | July 14, 1942 |

FOREIGN PATENTS

| Number | Country | Date |
|---|---|---|
| 462,271 | Great Britain | Mar. 5, 1937 |

Certificate of Correction

Patent No. 2,480,623                                                   August 30, 1949

EARLE W. BALLENTINE ET AL.

It is hereby certified that errors appear in the printed specification of the above numbered patent requiring correction as follows:

Column 5, line 42, for "alippage" read *slippage*; column 6, line 41, for "parsion" read *parison*; column 15, line 30, before "being" insert , *said cam element*; and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*